Oct. 31, 1950 V. O. LOTHMAN 2,528,010
CALCULATOR
Filed June 13, 1947 2 Sheets-Sheet 1
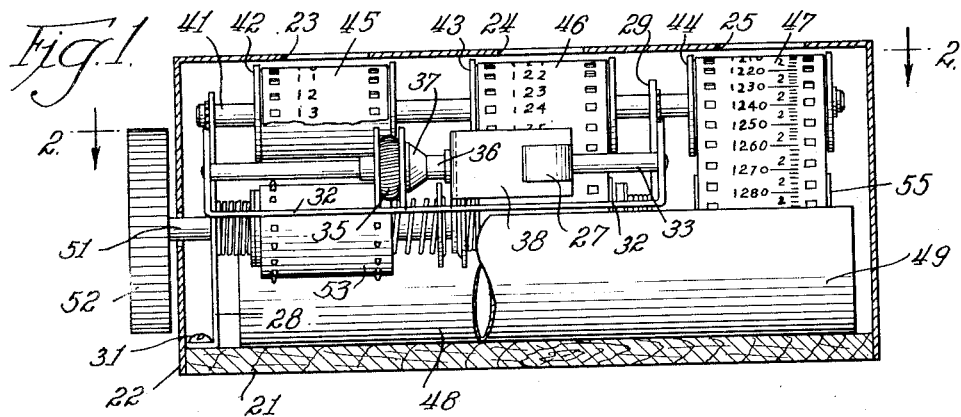
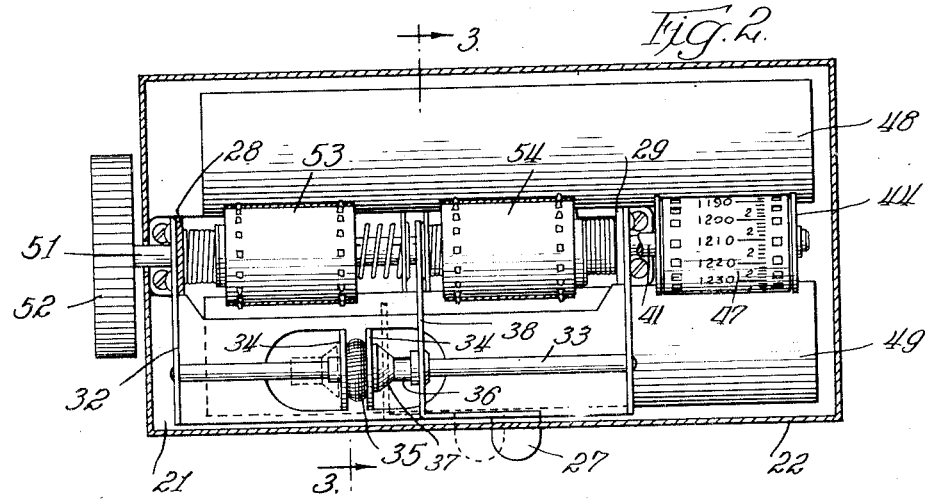
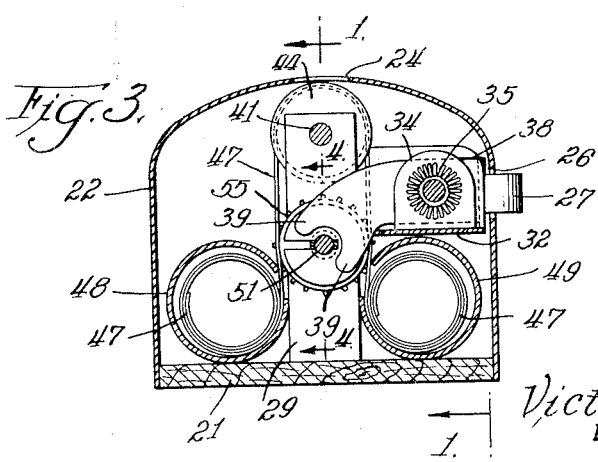
INVENTOR.
Victor O. Lothman
BY
J. Clarke Nagey
Atty.

Oct. 31, 1950 V. O. LOTHMAN 2,528,010
CALCULATOR
Filed June 13, 1947 2 Sheets-Sheet 2
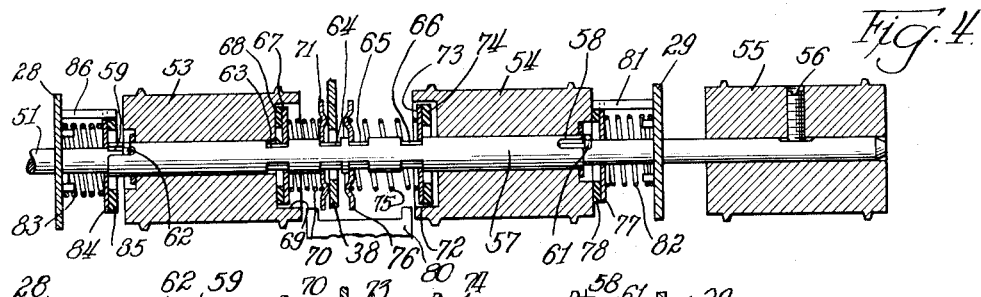
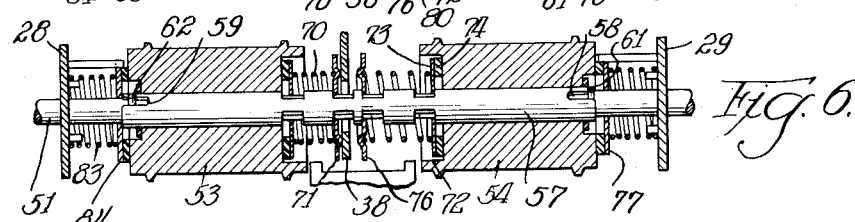
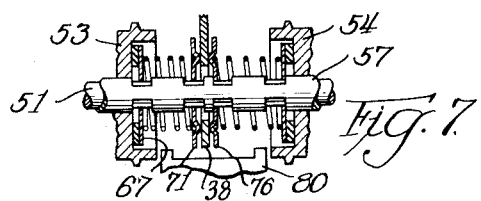
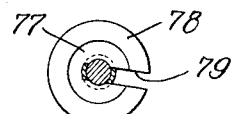
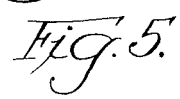
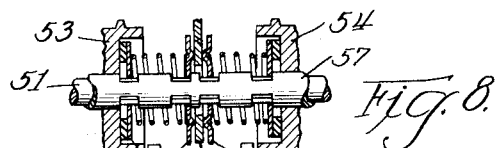
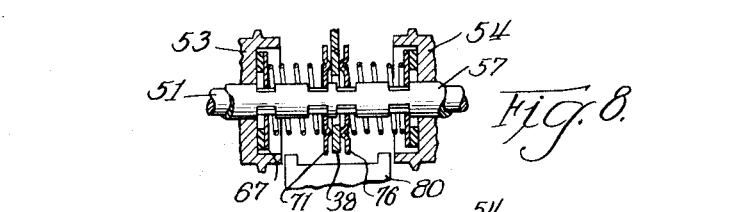
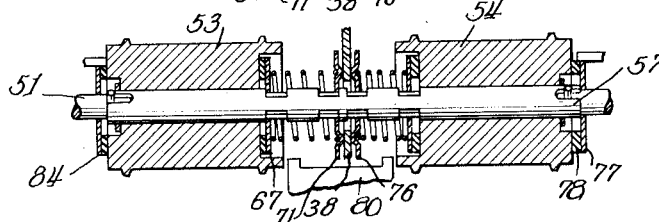
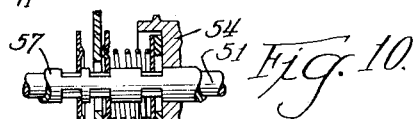
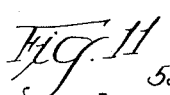
INVENTOR.
Victor O. Lothman
BY J. Clarke Nagey
Att'y.

Patented Oct. 31, 1950

2,528,010

UNITED STATES PATENT OFFICE 2,528,010

CALCULATOR

Victor O. Lothman, Evanston, Ill.

Application June 13, 1947, Serial No. 754,423

4 Claims. (Cl. 235—71)

The present invention relates to calculating machines, and more particularly to a relatively simple, inexpensive, and yet accurate manually operative device.

Various types of calculating machines have appeared on the market, but the majority of them are rather complicated and require considerable skill in operation. The simpler devices generally have had the disadvantage of being more or less inaccurate. While a slide rule is a relatively simple device from a mechanical construction viewpoint, it is limited to approximate calculation and requires some instruction and study. There are many times in almost every business where it would be desirable to have a relatively simple yet accurate device which is capable of handling the problems of multiplication, division, and the obtaining of percentages. Of course, it is possible to provide individual slide rules or calculators for the various special situations arising in business, but in the interest of economy it would be desirable to provide a calculating machine or device which is readily adaptable to specialized uses.

In accordance with the present invention, it is possible to provide a relatively simple and inexpensive calculating machine or device which employs the principle of logarithms, and thereby make available a device which is sufficiently accurate for the great majority of the calculations to be performed in connection with various business situations.

In accordance with the present invention, it is contemplated to employ a plurality of calibrated tapes which are so controlled with respect to one another that a point on the tape in cooperation with a hair line always represents a mathematical equation. In a preferred form, three tapes are employed, two of which are movable relative to each other so that the third tape displays the answer. Special tapes may be provided for special calculations, but the mechanism employed is the same in all instances.

It, therefore, is an object of the present invention to provide a relatively simple and inexpensive calculating machine or device provided with a plurality of replaceable tapes for different uses.

Another object of the present invention is to provide an improved calculating machine employing a plurality of tapes two of which are individually movable relative to a third tape.

Still another object of the present invention is to provide an improved calculating machine employing the principle of logarithms which is accurate and yet simple to manipulate.

A still further object of the present invention is to provide in a calculating machine clutch and braking means for maintaining each of two tapes coordinated with a third tape.

Still another object of the present invention is to provide an improved calculating device utilizing positive driving means for a plurality of tapes.

Still another object of the present invention is to provide in a calculating device, employing a plurality of movable indicators, positive means for stopping one indicator before moving another one.

Other and further objects of the present invention subsequently will become apparent by reference to the following description taken in conjunction with the accompanying drawings wherein:

Figure 1 is a side view of the present invention with the cover shown in cross-section and one element of the present device partially broken away;

Figure 2 is a plan view of the device as seen in the direction of the arrows along the stepped line 2—2 of Figure 1;

Figure 3 is a transverse cross-sectional view as seen in the direction of the arrows along the stepped line 3—3 of Figure 2;

Figure 4 is a cross-sectional view along the driving element of the device as seen in the direction of the arrows along the line 4—4 of Figure 3;

Figure 5 is an end view showing one of the brake and clutch discs employed in the device illustrated in Figure 4;

Figures 6, 7, 8, 9 and 10, illustrate the progressive movement of the shifting lever from its leftward postion shown in Figure 4 to that shown in Figure 11; and Figure 11 illustrates the relationship of certain elements when the shifting lever of the calculator has been moved into its rightward position.

Referring more particularly to the Figures 1, 2, and 3, of the drawing it will be seen that the present construction of the invention is provided with a base 21 which has a cover 22 having at its top three windows or apertures 23, 24 and 25. On the side the cover is provided with an aperture 26 through which a shifting button 27 projects from the mechanism within the cover.

Within the cover 22 there is provided a frame comprising a pair of upright members 28 and 29 which may be secured to the base 21 by means of screws 31. The upright members 28 and 29 are interconnected by a bracket 32 which carries a rod 33. Mounted on the bracket 32 are a pair of parallel upright brackets 34 each having apertures through which the rod 33 extends. Between the two brackets 34 there is mounted a toroidal spring 35.

Mounted on the rod is a sleeve 36 having a conical enlargement 37. The sleeve 36 is connected to a shifting lever and fork 38 having bifurcated extremities 39 as seen in Figure 3. The shifting button 27 is mounted on the lever and fork 38. The lever 38 may be moved from the position shown in Figure 2 to the dotted line position shown from which it will become apparent that the conical enlargement 37 passes through the toroidal spring 35 and that the spring acts as a means for urging the lever 38 in either of two positions. Thus means are provided for insuring that the shifting lever 38 cannot be left in an intermediate position. While this particular means has been shown in the drawing for accomplishing this result, it is to be understood that any other suitable means may be employed.

The frames comprising the upright brackets 28 and 29 also carry a shaft 41 which has mounted thereon a plurality of drums 42, 43 and 44. These drums 42, 43 and 44 carry tapes 45, 46 and 47 having indicia thereon which appear in the window openings 23, 24 and 25 respectively. The drums 42, 43 and 44 are mounted so as to rotate freely on the shaft 41 and hence are merely idler drums serving to hold the tapes adjacent to the observation windows. The ends of the tapes 45, 46 and 47 are contained within cylindrical storage compartments 48 and 49 which rest upon the base 21.

The frames 28 and 29 also carry a driving shaft 51 to which is secured a driving knob or wheel 52. Mounted on the shaft 51 directly beneath the drums 42, 43 and 44 are sprocket drums 53, 54 and 55. The latter drum 55 is fixedly secured to the shaft 51 whereas the other drums are so arranged that by means of a suitable mechanism they may be moved into and out of driving relation with respect to the shaft 51.

By referring more particularly to Figure 4 it will be noted that the drum 55 is secured to the shaft 51 by means of a set screw 56 or some other suitable fastening means.

Mounted on the shaft 51 is a sleeve 57 which carries the drums 53 and 54. The ends of the sleeve 57 are provided with notches 58 and 59 for cooperation with pins 61 and 62 which are secured transversely of the shaft 51. The notched ends 58 and 59 of the sleeve 57 are so arranged that the sleeve is reciprocable on the rod or shaft 51 for a certain distance. The sleeve 57 at its intermediate portion is provided with oppositely arranged notches or cut-away portions 63, 64, 65 and 66, respectively. Occupying the notch 63 and on the shaft 51 there is a clutch disc 67 having a friction surface 68 adapted to bear against the recessed end portion 69 of the drum 53. The disc 67 is engaged by a spring 70 which bears against another collar 71 which is mounted within the notch 64. A similar arrangement of elements is provided for the drum 54.

The drum 54 is provided with a recessed end 72 within which is mounted a clutch disc 73 occupying the notch 66 and carrying a friction surface 74. The clutch disc 73 is engaged by a spring 75 bearing against a collar 76 which is mounted in the notch 65. The fork 38 having bifurcated ends 39 is adapted to engage either the collar 71 or the collar 76 in order to bring about disengagement or engagement of the clutch surfaces with the different sprocket drums.

When the drum 53 is in driving relationship to the shaft 51 by virtue of arrangement of the parts in the position shown in Figure 4 it is desired to hold the other drum 54 in a fixed position. This is accomplished by the provision of a brake disc 77 having a friction surface 78. The brake disc such as shown in Figure 5 has a notch 79 for accommodating a rod or bar 81 which is secured to the upright support 29. This latter bar 81 prevents the brake disc 77 from rotating. The brake disc 77 is engaged by a spring 82 bearing against the end support plate 29.

The brake disc for the drum 53 which comprises the disc 84 and the friction surface 85 is similar to the disc shown in Figure 5. The clutch discs for both the drums comprising the disc 67 and friction surface 68 and the disc 73 and friction surface 74 are also similar in construction to the disc shown in Figure 5. The notches 79 however cooperate with the notches 63 and 66 of the sleeve 57 and the sides of the notches 79 fit about the rod or shaft 51. These notches 63 and 66 prevent the clutch discs from being displaced angularly relative to the rod 51 while permitting limited longitudinal movement relative thereto.

When the drum 54 is in driving relation with respect to the shaft 51 it is desired to hold the other drum 53 fixed. Accordingly, the other support bracket 28 is engaged by a spring 83 which bears against a brake disc 84 having a friction surface 85. The brake disc 84 is kept from rotating by a horizontal bar 86 carried by the vertical support 28.

The drum 54 is prevented from moving to the right by a washer which engages the pin 61, and similarly the drum 53 is kept from moving to the left by a washer which engages the pin 62. The springs of the clutch mechanism substantially prevent each drum from moving in the opposite direction, but to insure that neither drum will move longitudinally any appreciable amount during a clutch shifting operation there is provided the member 80 which is carried by the frame 32 or mounted on the base 21.

The arrangement of components shown and illustrated in Figure 4 constitute a clutch and brake arrangement providing certain concomitant or sequential operations whereby the brake is applied to a driven drum before that drum is released from engagement with its driving clutch and the driving clutch of the other drum is engaged with it prior to the time that its brake is released. Due to the snap action of the toroidal spring 35 cooperating with the conical enlargement 37 of the sleeve 36 the operations performed are substantially concomitant. The manner in which this operation takes place is illustrated by the positions of the various parts in Figs. 6 to 11 inclusive. In Figure 4 the brake for the drum 53 is disengaged therefrom and the drum is in engagement with its driving clutch. The drum 54 is held in fixed position by its brake. It now may be assumed that pressure has been applied to the operating button 27 which moves clutch fork 38 from left to right. The initial movement of the fork 38 is illustrated in Fig. 6 which shows that the spring 70 expands. At the same time the brake spring 83 also expands so that the brake disc 84 engages the drum 53 and also bears against the end of the sleeve 57 and shifts the sleeve toward the right. The movement of the sleeve 57 toward the right produces a movement of the collar 76 thus resulting in a movement of the clutch disc 73 so that the clutch surface 74 is in light engagement with the recessed surface 72 of the drum 54. The movement of the sleeve 57 however, is not yet sufficient to take up the clearance between the other end of the sleeve and the brake disc 77.

Figs. 7 and 8 show the relationship of the shifting fork or lever 38 with respect to the collars 71 and 76 during that portion of the time when the conical enlargement 37 of the sleeve 36 is passing through the toroidal spring 35. From these two figures and from Fig. 9 it will be noted that for a considerable interval the fork 38 is being contacted by both of the collars or plates 71 and 76. Snap action provided by the toroidal spring 35 insures movement of the fork 38 to the positions shown in Figures 10 and 11.

In Fig. 10 it will be noted that the shifting lever or fork 38 is no longer in engagement with the plate 71 and hence the clutch disc 67 is no longer in engagement with the drum 53. From Fig. 9 it will be noted that in that position the right end of the sleeve 57 has taken up the clearance between the sleeve and the brake disc 77 on the drum 54. Further movement toward the right of the sleeve 57 therefore moves the braking disc 77 away from the drum 54 so that the brake eventually reaches the position shown in Fig. 11. In that figure it is apparent that drum 53 still is held rigidly in position by its brake while drum 54 has been placed into driving relationship with the shaft 51.

The foregoing mode of operation has been provided to insure the proper relationship between the strips which are driven by the various drums 53, 54 and 55. In order that the tape driven by the third drum shall accurately display the answer in the window 25 it is necessary that the drum 55 always moves whenever there is any movement of either of the drums 53 or 54 while the other of these drums is held stationary by its brake.

If, for example, it is desired to multiply, either the multiplier or the multiplicand is set up on the tape exhibited in window 23 and driven by the drum 53. When the proper number has been brought under the hairline of window 23 the lever 38 is moved from the position shown in Fig. 4 to that illustrated in Fig. 11 whereupon the other number is thereupon made to appear at the hairline in window 24. When this has been accomplished the product may be read at the hairline in window 25.

If it is desired to divide one number by another the dividend may be set up in window 23 and the divisor may be set up in window 25 whereupon the quotient will appear in window 24. In either operation there is no difficulty encountered in determining where to place the decimal point as is the case when slide rule or other calculators are employed. The use of tapes also makes it possible to attain a much greater degree of accuracy since there is not the space limitation which is imposed upon the construction of a slide rule or upon other mechanical arrangements employing belts or drums. In one embodiment, tapes of 100 inches in length were employed thus providing an accuracy to four significant figures which is sufficient for most commercial percentage calculations.

By providing different sets of tapes for the device constructed in accordance with the present invention it is possible to make such other calculations as: wage calculations, invoice extensions, interest computations, prorations of expenses and costs, and percentage calculations of all types. To facilitate such computations the windows or openings of the casings which are each provided with a cross-hair may be appropriately labelled. Thus, for example, the lefthand window may be marked "Time worked," the center window, "Hourly rate," and the third or righthand window, "Amount of wages." The "Time worked" tape could be calibrated in hours and minutes so that the total amount may readily be obtained without consideration of the location of the decimal point as is the case in many other calculators and slide rules. The third or righthand window can further be divided into a plurality of columns so as to provide the total amount due for straight time, time and one-half, and double time.

A further example of the manner in which the windows and the cooperating tapes may be employed is where the lefthand window carries the notation, "Quantity," the center window, "Price" and the right hand window "Extension." The first tape would show all common fractions which are the usual source of difficulty on most calculators. Thus there is no need of converting the fractions to decimal equivalents. Similarly, the relationship between cost and retail price may be obtained by having the first window indicate the cost, the center window the retail price, and the third or righthand window the per cent markup. Likewise, the righthand window may be employed with two columns on the tape so as to provide a comparison of increase or decrease in percentage with respect to two different sets of costs to be indicated on the first two windows.

The foregoing illustrations are merely given as examples of a few of the calculations commonly encountered. By suitable tapes it is possible to provide convenient calculations for winding transformers, obtaining the inductance in coils, calculating the resonant frequencies, obtaining variations in proportions for chemical formulas, as well as the more common calculations ordinarily obtained through the use of slide rules including square root, cube root, sines, tangents, logarithms and other factors.

While for the purpose of illustrating and describing the present invention, a preferred embodiment has been shown in the drawings, it is to be understood that the invention is not to be limited thereby since such variations in the components and in their arrangement are contemplated as may be commensurate with the spirit and scope of the invention set forth in the following claims.

What I desire to protect by United States Letters Patent is claimed as follows:

1. A calculator comprising a plurality of tapes movable relative to each other, one of said tapes being subject to the cumulative movement of the remaining tapes, a supply container for said tapes, a storage container for said tapes, a drive shaft, a driving connection between said shaft and one of said tapes, means for arresting the movement of said one of said tapes relative to said drive shaft, and means for releasing said driving connection between said shaft and the arrested tape.

2. In a calculator, the combination comprising a plurality of sprocket members for driving a plurality of tapes having indicia thereon and bearing a certain mathematical relation to each other, a drive shaft for said sprocket members, a clutch mechanism for each sprocket member, a brake for each sprocket member, and means for operating said brakes and clutch mechanism to shift the connection of the drive shaft from one sprocket member to the other.

3. In a calculator the combination comprising a plurality of sprocket drums for driving a plurality of perforated tapes each having indicia thereon bearing a certain mathematical relation to the other tapes, a drive shaft for said drums, a clutch mechanism for each drum, a brake for each drum, and snap action means for operating said brakes and clutch mechanisms to shift the connections between the drive shaft and the drums.

4. In a calculator the combination comprising a plurality of sprocket drums for driving a plurality of perforated tapes each having indicia thereon bearing a certain mathematical relation to the indicia of other tapes, a drive shaft for said drums, a clutch mechanism for each drum, a brake for each drum, snap action means for operating said brakes and clutch mechanisms to shift the connection of the drive shaft from one drum to another, and a sprocket drum fixedly mounted on said drive shaft.

VICTOR O. LOTHMAN.

REFERENCES CITED

The following references are of record in the file of this patent:

UNITED STATES PATENTS

| Number | Name | Date |
| --- | --- | --- |
| 786,102 | Cooper | Mar. 28, 1905 |
| 1,777,692 | Fuss | Oct. 7, 1930 |
| 2,285,774 | Horner | June 9, 1942 |

FOREIGN PATENTS

| Number | Country | Date |
| --- | --- | --- |
| 370,993 | Germany | Mar. 9, 1923 |
| 447,001 | Great Britain | May 11, 1936 |